US011288446B2

(12) United States Patent
Lockhart et al.

(10) Patent No.: US 11,288,446 B2
(45) Date of Patent: *Mar. 29, 2022

(54) METHODS AND SYSTEMS FOR PROVIDING AN ELECTRONIC FORM

(71) Applicant: D2L Corporation, Kitchener (CA)

(72) Inventors: David Lockhart, Kitchener (CA); Jeff Geurts, Kitchener (CA); Steve Schoger, Kitchener (CA); Jeffrey Avis, Kitchener (CA)

(73) Assignee: D2l Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,154

(22) Filed: Nov. 18, 2020

(65) Prior Publication Data
US 2021/0174008 A1  Jun. 10, 2021

Related U.S. Application Data

(63) Continuation of application No. 16/520,747, filed on Jul. 24, 2019, now Pat. No. 10,867,126, which is a continuation of application No. 14/315,900, filed on Jun. 26, 2014, now Pat. No. 10,409,904.

(51) Int. Cl.
G06F 17/00 (2019.01)
G06F 40/174 (2020.01)
G06F 16/957 (2019.01)
G06F 3/0481 (2022.01)
G06F 3/0484 (2022.01)
G06F 40/106 (2020.01)

(52) U.S. Cl.
CPC .......... *G06F 40/174* (2020.01); *G06F 3/0481* (2013.01); *G06F 3/0484* (2013.01); *G06F 16/9577* (2019.01); *G06F 40/106* (2020.01)

(58) Field of Classification Search
CPC .. G06F 40/174; G06F 40/106; G06F 16/9577; G06F 3/0484; G06F 3/0481
See application file for complete search history.

(56) References Cited

U.S. PATENT DOCUMENTS

| 1,057,235 A | 3/1913 | Greene |
| 5,794,259 A * | 8/1998 | Kikinis .................. G06F 40/174 715/207 |
| 5,889,932 A | 3/1999 | Adegeest et al. |

(Continued)

*Primary Examiner* — Laurie A Ries
(74) *Attorney, Agent, or Firm* — Bereskin & Parr LLP/S.E.N.C.R.L., s.r.l.

(57) ABSTRACT

A method and system for providing an electronic form are described. The method and system include identifying a visible portion of the electronic form. The electronic form can include a control component at a component location of the electronic form that is operable to receive an input from a user. The method and system can then determine an accessibility state of the control component based on the component location and at least one of a display property of the display and the visible portion. The accessibility state can be a convenient state when the component location is suitable for the display but is in an inconvenient state when the component location is not suitable for the display. When it is determined that the accessibility state is the inconvenient state, the method and system involves displaying a transient control component, or a version of the control component, on the display.

20 Claims, 9 Drawing Sheets

(56) References Cited

U.S. PATENT DOCUMENTS

| | | |
|---|---|---|
| 6,471,521 B1 | 10/2002 | Dornbush et al. |
| 6,506,199 B2 | 1/2003 | Rogers et al. |
| 6,769,010 B1 | 7/2004 | Knapp et al. |
| 6,774,921 B1 | 8/2004 | Tadman et al. |
| 7,523,191 B1 | 4/2009 | Thomas et al. |
| 8,365,084 B1 * | 1/2013 | Lin .................... H04N 21/4312 715/769 |
| 8,577,957 B2 | 11/2013 | Behar et al. |
| 9,053,500 B2 | 6/2015 | Etesse et al. |
| 9,158,750 B2 * | 10/2015 | Matveief ............... G06F 40/174 |
| 9,262,746 B2 | 2/2016 | Linton et al. |
| 9,483,454 B2 | 11/2016 | Auger et al. |
| 10,460,026 B2 | 10/2019 | Wolfram et al. |
| 2002/0184401 A1 * | 12/2002 | Kadel, Jr. ................. G06F 9/54 719/315 |
| 2003/0025693 A1 * | 2/2003 | Haley .................... G06F 9/451 345/418 |
| 2004/0212640 A1 * | 10/2004 | Mann .................... G06F 3/0481 715/792 |
| 2005/0005234 A1 | 1/2005 | Chen |
| 2005/0021611 A1 | 1/2005 | Knapp et al. |
| 2006/0288072 A1 | 12/2006 | Knapp et al. |
| 2007/0073934 A1 | 3/2007 | Rogers |
| 2008/0254438 A1 | 10/2008 | Woolf et al. |
| 2010/0070924 A1 | 3/2010 | Hart, II et al. |
| 2010/0153544 A1 * | 6/2010 | Krassner ............. G06F 16/9577 709/224 |
| 2011/0007364 A1 * | 1/2011 | Brundage .......... H04N 1/00838 358/3.28 |
| 2011/0035263 A1 * | 2/2011 | Ramanathan ........... G06Q 30/02 705/14.4 |
| 2011/0302516 A1 | 12/2011 | White et al. |
| 2012/0149000 A1 | 6/2012 | Baker et al. |
| 2012/0200863 A1 * | 8/2012 | Ormond ............. H04N 1/32133 358/1.2 |
| 2012/0231441 A1 | 9/2012 | Parthasarathy et al. |
| 2012/0254402 A1 * | 10/2012 | Panidepu ................ H04L 67/02 709/224 |
| 2012/0266068 A1 * | 10/2012 | Ryman .................... G06F 9/452 715/719 |
| 2013/0031208 A1 | 1/2013 | Linton et al. |
| 2013/0227386 A1 | 8/2013 | Ferlin |
| 2013/0229334 A1 | 9/2013 | Kim |
| 2013/0246904 A1 | 9/2013 | Seliger et al. |
| 2013/0297997 A1 | 11/2013 | Stanley |
| 2013/0325665 A1 | 12/2013 | Shaffer et al. |
| 2014/0236720 A1 | 8/2014 | Shunock et al. |
| 2014/0237342 A1 * | 8/2014 | King .................... G06F 16/955 715/224 |
| 2015/0026176 A1 | 1/2015 | Bullock |
| 2015/0242977 A1 | 8/2015 | Shaffer et al. |
| 2015/0381722 A1 | 12/2015 | Lam et al. |
| 2017/0220542 A1 | 8/2017 | Wolfram et al. |

* cited by examiner

METHODS AND SYSTEMS FOR PROVIDING AN ELECTRONIC FORM

CROSS-REFERENCE TO RELATED PATENT APPLICATION

This application is a continuation of U.S. patent application Ser. No. 14/315,900 filed on Jun. 26, 2014, which is a continuation of U.S. patent application Ser. No. 16/520,747 filed on Jul. 24, 2019, entitled "METHODS AND SYSTEMS FOR PROVIDING AN ELECTRONIC FORM", the entire contents of which are hereby incorporated by reference herein for all purposes.

TECHNICAL FIELD

The described embodiments relate to methods and systems associated with providing an electronic form, and in particular, to providing an electronic form in an electronic learning system.

INTRODUCTION

Many web-based systems, whether internal or external, provide user interfaces for receiving inputs from users. Electronic learning (also known as "e-Learning" or "eLearning") systems, for example, can include such user interfaces.

Electronic learning generally refers to education or learning where users engage in education related activities using computers and other computing devices. For example, users may enroll or participate in a course or program of study offered by an educational institution (e.g., a college, university or grade school) through a web interface that is accessible over the Internet. Users may receive assignments electronically, participate in group work and projects by collaborating over the Internet, and be graded based on assignments and examinations that are submitted, for example, using an electronic submission tool.

Electronic learning is not limited to use by educational institutions. Electronic learning may be used in other environments, such as government and corporations. For example, employees at a regional branch office of a corporation may use electronic learning to participate in a training course offered by another office, or even a third-party provider. As a result, the employees at the regional branch office can participate in the training course without having to travel to the site providing the training course. Travel time and costs can be reduced and conserved.

Generally, for web-based systems, the user interfaces can be provided via a browser application or other applications. The user interfaces can include electronic forms.

Electronic forms generally include various different control and data fields for receiving inputs from users. Some of the control fields include control buttons for receiving an input that initiates communication with the web-based system. Example control buttons include a control button for submitting the data in the data fields to the web-based system to complete the electronic form, or a control button for simply saving the data in the data fields. The control buttons generally appear near an end of the electronic form.

Oftentimes, the electronic form can be longer than a display region of the browser application or other applications so that scrolling is required to view the other portions of the electronic form. As a result, the control buttons may not be easily accessible, or even initially visible to the user, without requiring the user to repeatedly scroll through the electronic form.

SUMMARY OF SOME EMBODIMENTS

The various embodiments described herein generally relate to methods (and associated systems configured to implement the methods) for providing an electronic form.

In accordance with one embodiment, there is provided a method of providing an electronic form for a display. The method includes identifying a visible portion of the electronic form, the electronic form including a control component at a component location of the electronic form and the control component being operable to receive an input from a user; determining whether to provide a transient control component within the visible portion, the transient control component being a version of the control component and the determining whether to provide the transient control component including: identifying whether the component location is within the visible portion; assessing whether the transient control component is usable based on at least one of a display property of the display and the component location; and indicating the transient control component is to be provided within the visible portion when the component location is at least partially beyond the visible portion and the transient control component is usable; and displaying the transient control component within the visible portion when the transient control component determined to be provided.

In some embodiments, assessing whether the transient control component is usable based on at least one of the display property of the display and the component location includes determining a component distance between the component location and an edge of the visible portion; determining if the component distance is less than a transient threshold, the transient threshold being a minimum distance between the visible portion and the component location before the transient control component is usable; and indicating the transient control component is usable when the component distance is greater than the transient threshold.

In some embodiments, the display property comprises a device type of the display; and the method further comprises: determining the device type is a mobile display type, the mobile display type indicating the display is provided on a mobile device; and indicating the transient control component is unusable when the device type is the mobile display type.

In some embodiments, the display property comprises a viewing size of the display; and the method includes determining if the viewing size is less than a size threshold, the size threshold being a minimum view area required for the transient control component to be usable; and indicating the transient control component is usable when the viewing size corresponds to at least the size threshold.

In accordance with another embodiment, there is provided a system for providing an electronic form for a display. The system includes a processor configured to identify a visible portion of the electronic form, the electronic form including a control component at a component location of the electronic form and the control component being operable to receive an input from a user; determine whether to provide a transient control component within the visible portion, the transient control component being a version of the control component and the determining whether to provide the transient control component including: identifying whether the component location is within the visible portion; assessing whether the transient control component is usable based on at least one of a display property of the display and the component location; and indicating the transient control component is to be provided within the visible portion when the component location is at least partially beyond the visible portion and the transient control component is usable; and display the transient control component within the visible portion when the transient control component determined to be provided.

In some embodiments, the processor is configured to: determine a component distance between the component location and an edge of the visible portion; determine if the component distance is less than a transient threshold, the transient threshold being a minimum distance between the visible portion and the component location before the transient control component is usable; and indicate the transient control component is usable when the component distance is greater than the transient threshold.

In some embodiments, the display property comprises a device type of the display; and the processor is configured to: determine the device type is a mobile display type, the mobile display type indicating the display is provided on a mobile device; and indicate the transient control component is unusable when the device type is the mobile display type.

In some embodiments, the display property comprises a viewing size of the display; and the processor is configured to: determine if the viewing size is less than a size threshold, the size threshold being a minimum view area required for the transient control component to be usable; and indicate the transient control component is usable when the viewing size corresponds to at least the size threshold.

In accordance with another embodiment, there is provided a method of providing an electronic form for a display. The method includes: identifying a visible portion of the electronic form, the electronic form including a control component at a component location of the electronic form and the control component being operable to receive an input from a user; determining an accessibility state of the control component based on the component location and at least one of a display property of the display and the visible portion, the accessibility state being a convenient state when the component location is suitable for the display and the accessibility state being an inconvenient state when the component location is not suitable for the display; and in response to determining that the accessibility state is the inconvenient state, displaying a transient control component on the display, the transient control component being a version of the control component.

In some embodiments, the display property comprises a viewing size of the display, the viewing size indicating an area available for displaying the electronic form; and identifying the visible portion of the electronic form includes: receiving a top display position of the electronic form, the top display position being a first location of the electronic form and the first location corresponding to a top edge of the display; determining, based on the top display position and the viewing size, a bottom display position of the electronic form, the bottom display position being a second location of the electronic form, the second location correspond to a bottom edge of the display and the bottom edge being opposite from the top edge; and defining the visible portion according to the top display position and the bottom display position.

In some embodiments, determining the accessibility state of the control component includes determining if the component location is within the visible portion; and in response to determining the component location is within the visible portion, setting the accessibility state as the convenient state and otherwise, setting the accessibility state as the inconvenient state.

In some embodiments, determining the accessibility state of the control component includes determining whether the transient control component is usable based on at least one of the component location, the display property and the visible portion; and setting the accessibility state as the convenient state when the transient control component is unusable.

In some embodiments, the method further includes: determining if the component location is within the visible portion; in response to determining the component location is outside the visible portion, determining a component distance between the component location and an edge of the visible portion; determining if the component distance is less than a transient threshold, the transient threshold being a minimum distance between the visible portion and the component location before the transient control component is usable; and indicating the transient control component is usable when the component distance is greater than the transient threshold.

In some embodiments, displaying the transient control component on the display comprises: displaying the transient control component in at least one of a colour, pattern and size different from the respective colour, pattern and size of the control component.

In some embodiments, the control component comprises: at least one push button control configured for receiving the input for submitting any one of a request to save data provided on the electronic form, a request to remove any data provided on the electronic form, and a request to proceed to a subsequent page of the electronic form.

In some embodiments, the component location is at a substantially end portion of the electronic form.

In accordance with another embodiment, there is provided a system for providing an electronic form for a display. The system includes a processor configured to: identify a visible portion of the electronic form, the electronic form including a control component at a component location of the electronic form and the control component being operable to receive an input from a user; determine an accessibility state of the control component based on the component location and at least one of a display property of the display and the visible portion, the accessibility state being a convenient state when the component location is suitable for the display and the accessibility state being an inconvenient state when the component location is not suitable for the display; and in response to determining that the accessibility state is the inconvenient state, display a transient control component on the display, the transient control component being a version of the control component.

In some embodiments, the display property comprises a viewing size of the display, the viewing size indicating an area available for displaying the electronic form; and the processor is configured to: receive a top display position of the electronic form, the top display position being a first location of the electronic form and the first location corresponding to a top edge of the display; determine, based on the top display position and the viewing size, a bottom display position of the electronic form, the bottom display position being a second location of the electronic form, the second location correspond to a bottom edge of the display and the bottom edge being opposite from the top edge; and define the visible portion according to the top display position and the bottom display position.

In some embodiments, the processor is configured to: determine if the component location is within the visible portion; and in response to determining the component location is within the visible portion, set the accessibility state as the convenient state and otherwise, set the accessibility state as the inconvenient state.

In some embodiments, the processor is configured to: determine whether the transient control component is usable based on at least one of the component location, the display property and the visible portion; and set the accessibility state as the convenient state when the transient control component is unusable.

In some embodiments, the processor is configured to: determine if the component location is within the visible portion; in response to determining the component location is outside the visible portion, determine a component distance between the component location and an edge of the visible portion; determine if the component distance is less than a transient threshold, the transient threshold being a minimum distance between the visible portion and the component location before the transient control component is usable; and indicate the transient control component is usable when the component distance is greater than the transient threshold.

In some embodiments, the processor is configured to: display the transient control component in at least one of a colour, pattern and size different from the respective colour, pattern and size of the control component.

BRIEF DESCRIPTION OF THE DRAWINGS

Several embodiments will now be described in detail with reference to the drawings, in which.

Figure 1A:
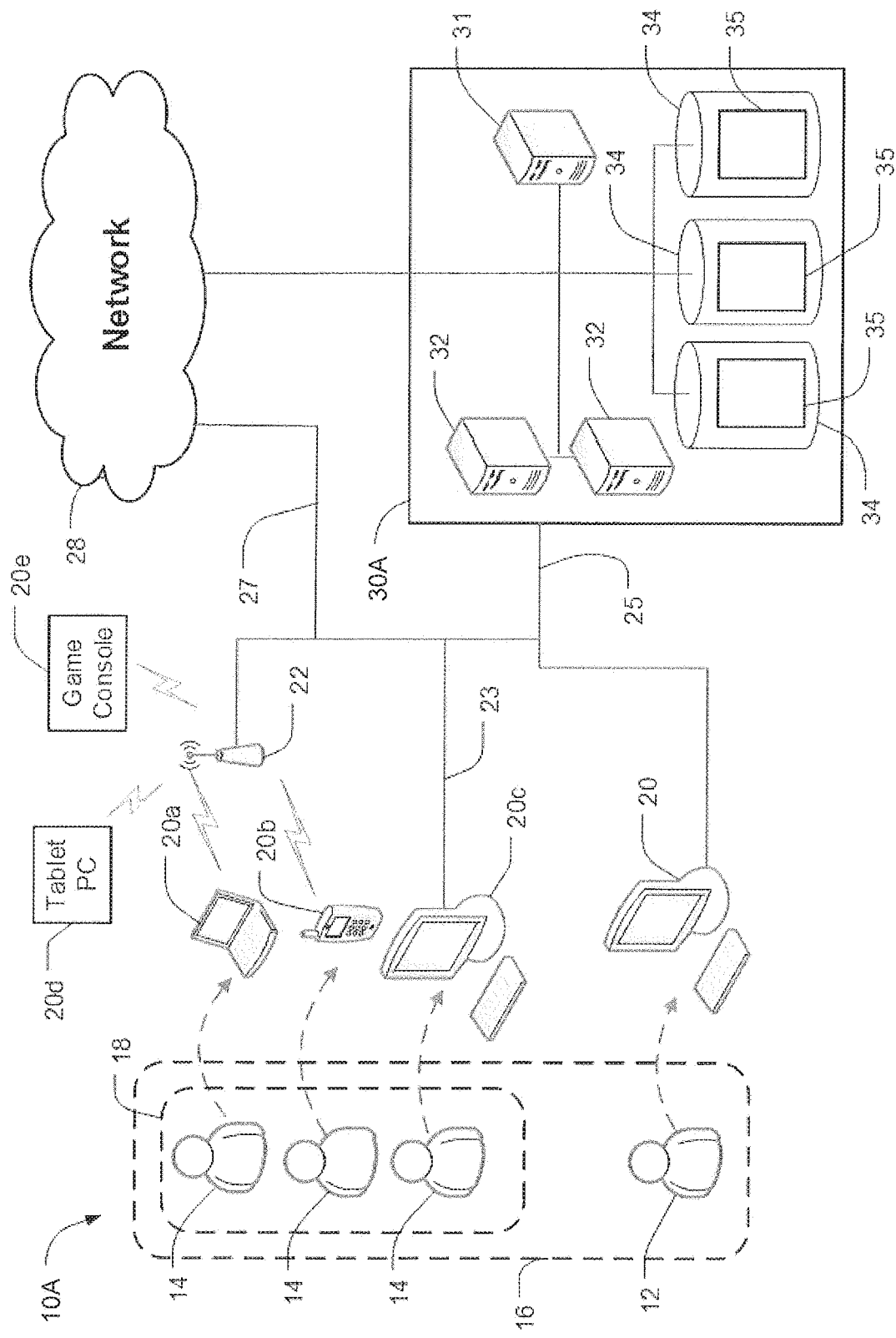
FIG. 1A is a schematic diagram of components interacting with an electronic learning system in accordance with some embodiments.

The drawings, described below, are provided for purposes of illustration, and not of limitation, of the aspects and features of various examples of embodiments described herein.

DESCRIPTION OF SOME EMBODIMENTS

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments.

The embodiments of the systems and methods described herein may be implemented in hardware or software, or a combination of both. In some cases, embodiments may be implemented in one or more computer programs executing on one or more programmable computing devices comprising at least one processor, a data storage component (including volatile memory or non-volatile memory or other data storage elements or a combination thereof) and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

In some embodiments, each program may be implemented in a high level procedural or object-oriented programming and/or scripting language to communicate with a computer system. However, the programs can be implemented in assembly or machine language, if desired. In any case, the language may be a compiled or interpreted language.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

In some embodiments, the systems and methods as described herein may also be implemented as a non-transitory computer-readable storage medium configured with a computer program, wherein the storage medium so configured causes a computer to operate in a specific and pre-defined manner to perform at least some of the functions as described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

The various embodiments described herein generally relate to methods (and associated systems configured to implement the methods) for providing electronic forms. Generally, electronic forms can include various different control and data fields for receiving inputs from users. The electronic forms can be provided in web-based systems via a browser application or other applications.

Some of the control fields can include control buttons for receiving inputs that initiate communication with the web-based system. For example, a submission control button can receive an input for submitting the data in the data fields to the web-based system to complete the electronic form, and a save control button can receive an input for simply saving the data in the data fields to the web-based system. Other types of control buttons can similarly be provided on an electronic form.

In some instances, the electronic form may be longer than a display region of the browser application, or other applications that can display the electronic form, and so, scrolling of the display region of those applications is required to view the other portions of the electronic form. As a result, the control buttons, which are typically provided near an end of the electronic form, may not be easily accessible, or even initially visible to the user. To access or view the control buttons, the user likely needs to scroll through a substantial portion of the electronic form. This can be particularly onerous if the electronic form is lengthy and the user decides to edit certain fields of the electronic form after otherwise completing the other portions of the electronic form. Also, when the control buttons are not initially visible to the users, some users may not understand how to navigate away from the electronic form or between the pages of a multi-page electronic form. Instead, the users may try to use the navigation controls of the browser application, which may cause data already entered into the data fields to become lost.

The described methods (and associated systems configured to implement the methods) can facilitate access to the functionalities of the control buttons by providing, when appropriate, a transient control component, which is a version of at least some of the control fields in the electronic form.

The methods, herein, involve identifying a visible portion of the electronic form when the electronic form is provided on a display. The visible portion of the electronic form is a portion of the electronic form that is viewable by the user. The visible portion may vary based on a size of the display and/or a size of the application on which the electronic form is being displayed. The visible portion may vary as the user scrolls through the electronic form and/or if the size of application displaying the electronic form is adjusted.

The various control buttons associated with the overall electronic form, such as the submission, save or navigation control buttons, are generally provided together, and typically near an end of the electronic form. It is, therefore, possible for these control buttons to not always appear within the visible portion depending on various factors, such as the size of the display or the application providing the display for example.

After identifying the visible portion, the methods can involve determining an accessibility state of the control components. The accessibility state can generally indicate whether the component location is suitable for the display or not. The accessibility state can be determined based on various factors, such as the component location and a display property of the display and/or the visible portion identified. Depending on the accessibility state that is determined, the transient control component may be displayed at any location of the display. With the described methods and systems, at least one of the transient control component and the control component will be reasonably accessible to the user.

As noted, electronic learning systems are example systems that can provide electronic forms. An example electronic learning system is described with reference to FIG. 1A.

Referring now to FIG. 1A, illustrated therein is a schematic diagram 10A of components interacting with an electronic learning system 30A for providing electronic learning according to some embodiments.

As shown in the schematic diagram 10A, one or more users 12, 14 may access the electronic learning system 30A to participate in, create, and consume electronic learning services, including educational content such as courses. In some cases, the electronic learning system 30A may be part of (or associated with) a traditional "bricks and mortar" educational institution (e.g. a grade school, university or college), another entity that provides educational services (e.g. an online university, a company that specializes in offering training courses, an organization that has a training department, etc.), or may be an independent service provider (e.g. for providing individual electronic learning).

It should be understood that a course is not limited to formal courses offered by formal educational institutions. The course may include any form of learning instruction offered by an entity of any type. For example, the course may be a training seminar at a company for a group of employees or a professional certification program (e.g. Project Management Professional™ (PMP), Certified Management Accountants (CMA), etc.) with a number of intended participants.

In some embodiments, one or more educational groups 16 can be defined to include one or more users 12, 14. For example, as shown in FIG. 1A, the users 12, 14 may be grouped together in the educational group 16. The educational group 16 can be associated with a particular course (e.g. History 101 or French 254, etc.), for example. The educational group 16 can include different types of users. A first user 12 can be responsible for organizing and/or teaching the course (e.g. developing lectures, preparing assignments, creating educational content, etc.), such as an instructor or a course moderator. The other users 14 can be consumers of the course content, such as students.

In some examples, the users 12, 14 may be associated with more than one educational group 16 (e.g. some users 14 may be enrolled in more than one course, another example user 12 may be a student enrolled in one course and an instructor responsible for teaching another course, a further example user 12 may be responsible for teaching several courses, and so on).

In some examples, educational sub-groups 18 may also be formed. For example, the users 14 shown in FIG. 1A form an educational sub-group 18. The educational sub-group 18 may be formed in relation to a particular project or assignment (e.g. educational sub-group 18 may be a lab group) or based on other criteria. In some embodiments, due to the nature of electronic learning, the users 14 in a particular educational sub-group 18 may not need to meet in person, but may collaborate together using various tools provided by the electronic learning system 30A.

In some embodiments, other educational groups 16 and educational sub-groups 18 could include users 14 that share common interests (e.g. interests in a particular sport), that participate in common activities (e.g. users that are members of a choir or a club), and/or have similar attributes (e.g. users that are male, users under twenty-one years of age, etc.).

Communication between the users 12, 14 and the electronic learning system 30A can occur either directly or indirectly using any one or more suitable computing devices. For example, the user 12 may use a computing device 20 having one or more device processors such as a desktop computer that has at least one input device (e.g. a keyboard and a mouse) and at least one output device (e.g. a display screen and speakers).

The computing device 20 can generally be any suitable device for facilitating communication between the users 12, 14 and the electronic learning system 30A. For example, the computing device 20 could be wirelessly coupled to an access point 22 (e.g. a wireless router, a cellular communications tower, etc.), such as a laptop 20a, a wirelessly enabled personal data assistant (PDA) or smart phone 20b, a tablet computer 20d, or a game console 20e. The computing device 20 could be coupled to the access point 22 over a wired connection 23, such as a computer terminal 20c.

The computing devices 20 may communicate with the electronic learning system 30A via any suitable communication channels.

The computing devices 20 may be any networked device operable to connect to the network 28. A networked device is a device capable of communicating with other devices through a network such as the network 28. A network device may couple to the network 28 through a wired or wireless connection.

As noted, these computing devices 20 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. These computing devices 20 may be handheld and/or wearable by the user.

In some embodiments, these computing devices may be a laptop 20a, or a smartphone device 20b equipped with a network adapter for connecting to the Internet. In some embodiments, the connection request initiated from the computing devices 20a, 20b may be initiated from a browser application and directed at the browser-based communications application on the electronic learning system 30A.

For example, the computing devices 20 may communicate with the electronic learning system 30A via the network 28. The network 28 may include a local area network (LAN) (e.g., an intranet) and/or an external network (e.g., the Internet). For example, the computing devices 20 may access the network 28 by using a browser application provided on the computing device 20 to access one or more web pages presented over the Internet via a data connection 27.

The network 28 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the computing devices 20 and the electronic learning system 30A, for example.

In some examples, the electronic learning system 30A may authenticate an identity of one or more of the users 12, 14 prior to granting the user 12, 14 access to the electronic learning system 30A. For example, the electronic learning system 30A may require the users 12, 14 to provide identifying information (e.g., a login name and/or a password) in order to gain access to the electronic learning system 30A.

In some examples, the electronic learning system 30A may allow certain users 12, 14, such as guest users, access to the electronic learning system 30A without requiring authentication information to be provided by those guest users. Such guest users may be provided with limited access, such as the ability to review one or more components of the course to decide whether they would like to participate in the course but without the ability to post comments or upload electronic files.

In some embodiments, the electronic learning system 30A may communicate with the access point 22 via a data connection 25 established over the LAN. Alternatively, the electronic learning system 30A may communicate with the access point 22 via the Internet or another external data communications network. For example, one user 14 may use the laptop 20a to browse to a webpage (e.g. a course page) that displays elements of the electronic learning system 30A, or an electronic form for providing inputs to the electronic learning system 30A.

The electronic learning system 30A can include one or more components for providing electronic learning services. It will be understood that in some embodiments, each of the one or more components may be combined into fewer number of components or may be separated into further components. Furthermore, the one or more components in the electronic learning system 30A may be implemented in software or hardware, or a combination of software and hardware.

For example, the electronic learning system 30A can include one or more processing components, such as computing servers 32. Each computing server 32 can include one or more processor. The processors provided at the computing servers 32 can be referred to as "system processors" while processors provided at computing devices 20 can be referred to as "device processors". The computing servers 32 may be a computing device 20 (e.g. a laptop or personal computer).

It will be understood that although two computing servers 32 are shown in FIG. 1A, one or more than two computing servers 32 may be provided. The computing servers 32 may be located locally together, or distributed over a wide geographic area and connected via the network 28.

The system processors may be configured to control the operation of the electronic learning system 30A. The system processors can initiate and manage the operations of each of the other components in the electronic learning system 30A. The system processor may also determine, based on received data, stored data and/or user preferences, how the electronic learning system 30A may generally operate or how the contents, such as electronic forms, are provided to a display of the computing devices 20 in accordance with the described methods.

The system processor may be any suitable processors, controllers or digital signal processors that can provide sufficient processing power depending on the configuration, purposes and requirements of the electronic learning system 30A. In some embodiments, the system processor can include more than one processor with each processor being configured to perform different dedicated tasks.

In some embodiments, the computing servers 32 can transmit data (e.g. electronic files such as web pages) over the network 28 to the computing devices 20. The data may include electronic files, such as webpages with course information, associated with the electronic learning system 30A. Once the data is received at the computing devices 20, the device processors can operate to display the received data.

The electronic learning system 30A may also include one or more data storage components 34 that are in electronic communication with the computing servers 32. The data storage components 34 can include RAM, ROM, one or more hard drives, one or more flash drives or some other suitable data storage elements such as disk drives, etc. The data storage components 34 may include one or more databases, such as a relational database (e.g., a SQL database), for example.

The data storage components 34 can store various data associated with the operation of the electronic learning system 30A. For example, course data 35, such as data related to a course's framework, educational content, and/or records of assessments, may be stored at the data storage components 34. The data storage components 34 may also store user data, which includes information associated with the users 12, 14. The user data may include a user profile for each user 12, 14, for example. The user profile may include personal information (e.g., name, gender, age, birthdate, contact information, interests, hobbies, etc.), authentication information to the electronic learning system 30A (e.g., login identifier and password) and educational information (e.g., which courses that user is enrolled in, the user type, course content preferences, etc.).

The data storage components 34 may also store data associated with the electronic forms that are provided by the electronic learning system 30A. The form data may include the electronic forms themselves (e.g., data fields, control fields, etc.) and the various factors and thresholds associated with determining whether to provide a transient control component, as will be described. Data received via the various electronic forms can also be stored in the data storage components 34.

The data storage components 34 can store authorization criteria that define the actions that may be taken by certain users 12, 14 with respect to the various educational contents provided by the electronic learning system 30A. The authorization criteria can define different security levels for different user types. For example, there can be a security level for an instructing user who is responsible for developing an educational course, teaching it, and assessing work product from the student users for that course. The security level for those instructing users, therefore, can include, at least, full editing permissions to associated course content and access to various components for evaluating the students in the relevant courses.

In some embodiments, some of the authorization criteria may be pre-defined. For example, the authorization criteria can be defined by administrators so that the authorization criteria are consistent for the electronic learning system 30A, as a whole. In some further embodiments, the electronic learning system 30A may allow certain users, such as instructors, to vary the pre-defined authorization criteria for certain course contents.

The electronic learning system 30A can also include one or more backup servers 31. The backup server 31 can store a duplicate of some or all of the data 35 stored on the data storage components 34. The backup server 31 may be desirable for disaster recovery (e.g. to prevent data loss in the event of an event such as a fire, flooding, or theft). It should be understood that although only one backup server 31 is shown in FIG. 1A, one or more backup servers 31 may be provided in the electronic learning system 30A. The one or more backup servers 31 can also be provided at the same geographical location as the electronic learning system 30A, or one or more different geographical locations.

The electronic learning system 30A can include other components for providing the electronic learning services. For example, the electronic learning system 30A can include a management component that allows users 12, 14 to add and/or drop courses and a communication component that enables communication between the users 12, 14 (e.g., a chat software, etc.). The communication component may also enable the electronic learning system 30A to benefit from tools provided by third-party vendors.

Figure 1B:
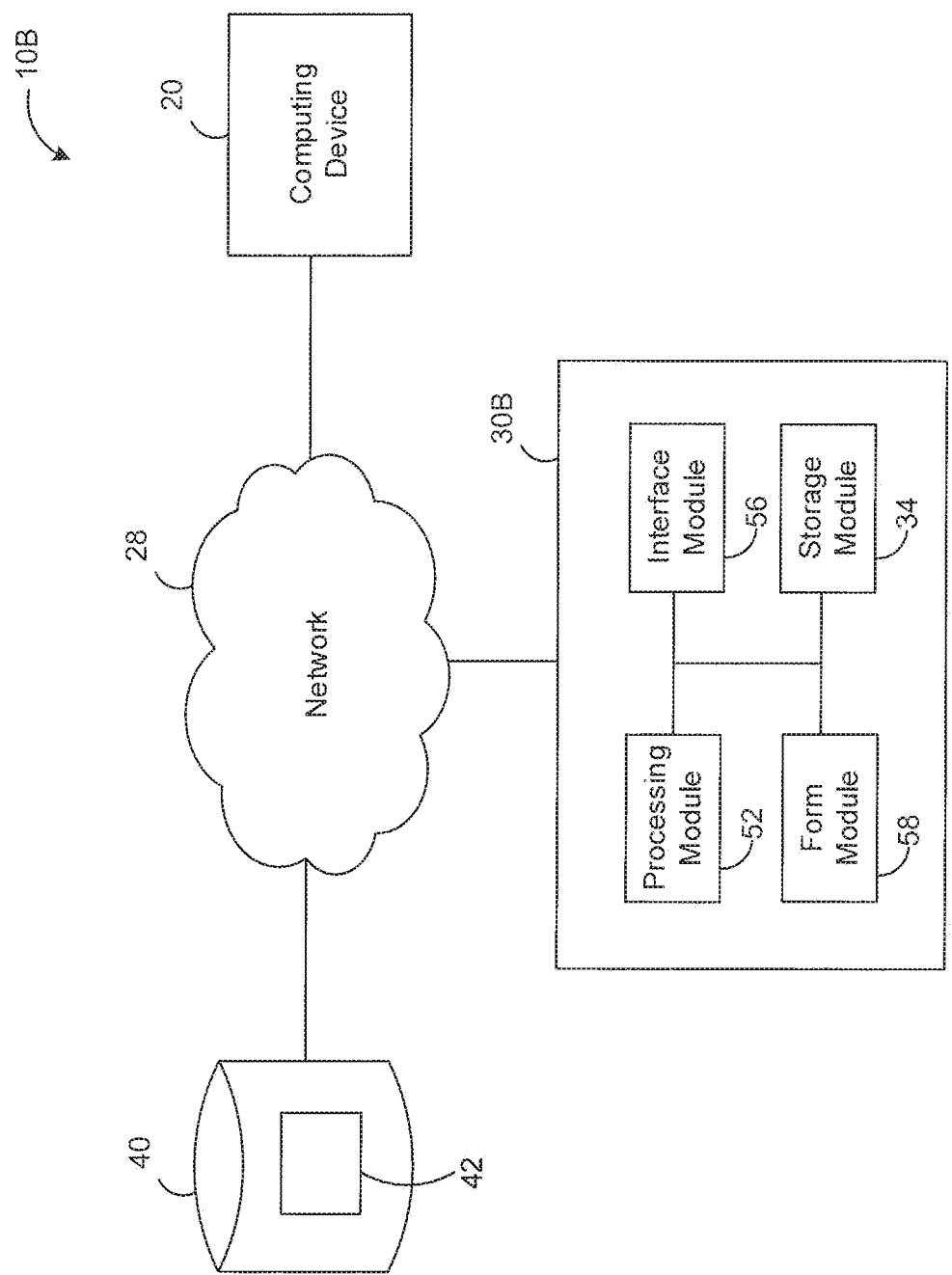
FIG. 1B is a block diagram of components interacting with a server system in accordance with some embodiments.

Referring now to FIG. 1B, which is a block diagram 10B of components interacting with a server system 30B in accordance with some embodiments. The server system 30B can generally be any web-based system that can operate according to the described methods. The server system 30B can operate as an electronic learning system and therefore, can be another example embodiment of the electronic learning system 30A.

Similar the schematic diagram 10A of FIG. 1A, the block diagram 10B of FIG. 1B illustrates the server system 30B in electronic communication with the computing device 20 and a system storage component 40 via the network 28.

The server system 30B, similar to the electronic learning system 30A, can include a storage module 34, a processing module 52, and an interface module 56. The server system 30B can also include a form module 58 that can be operated, by the processing module 52, to provide the described methods. It will be understood that even though the form module 58 is not shown in FIG. 1A, the functionalities of the form module 58 can be provided by at least one of the computing servers 32.

Each of the processing module 52, the interface module 56, the storage module 34 and the form module 58 can be in electronic communication with one another. It should be noted that, in some embodiments, the processing module 52, the interface module 56, the storage module 34 and the form module 58 may be combined or may be separated into further modules. Furthermore, the processing module 52, the interface module 56, the storage module 34 and the form module 58 may be implemented using software, hardware or a combination of both software and hardware.

The system storage component 40 and the storage module 34 operate in a similar manner as the data storage components 34 of FIG. 1A. Like the data storage components 34, the system storage component 40 and the storage module 34 can store various data 42 associated with the operation of the server system 30B, such as user data (e.g., user profiles, user preferences, etc.), form data and other relevant data.

The system storage component 40 is provided remotely from the server system 30B. The storage module 34 may receive data from and/or transmit data to the system storage component 40.

Similar to the system processor at the computing server 32, the processing module 52 may also determine, based on received data, stored data and/or user preferences, how the server system 30B may generally operate or how the contents, such as electronic forms, are provided to the computing device 20 in accordance with the methods described herein.

The interface module 56 may be any interface that enables the server system 30B to communicate with the other components shown in the block diagram 10B. The interface module 56 may also include any interface that enables the server system 30B to communicate with third-party systems. In some embodiments, the interface module 56 can include at least one of a serial port, a parallel port or a USB port. The interface module 56 may also include at least one of an Internet, Local Area Network (LAN), Ethernet, Firewire, modem or digital subscriber line connection. Various combinations of these elements may be incorporated within the interface module 56.

In some embodiments, the interface module 56 may receive input from the computing devices 20 via various input components, such as a mouse, a keyboard, a touch screen, a thumbwheel, a track-pad, a track-ball, a card-reader, voice recognition software and the like depending on the requirements and implementation of the server system 30B.

In some embodiments, the interface module 56 may operate with the form module 58 and the processing module 52 to display the relevant content to the user, such as the electronic forms. The interface module 56 can then provide the inputs received via the electronic forms to the processing module 52 for consideration.

The form module 58 can include software and/or hardware components, and data associated with the various methods for providing the electronic forms, as described herein. The processing module 52 can initiate operation of the form module 58 for providing the electronic forms, for example. Example embodiments will now be described with reference to FIGS. 2 to 5B.

Figure 3:
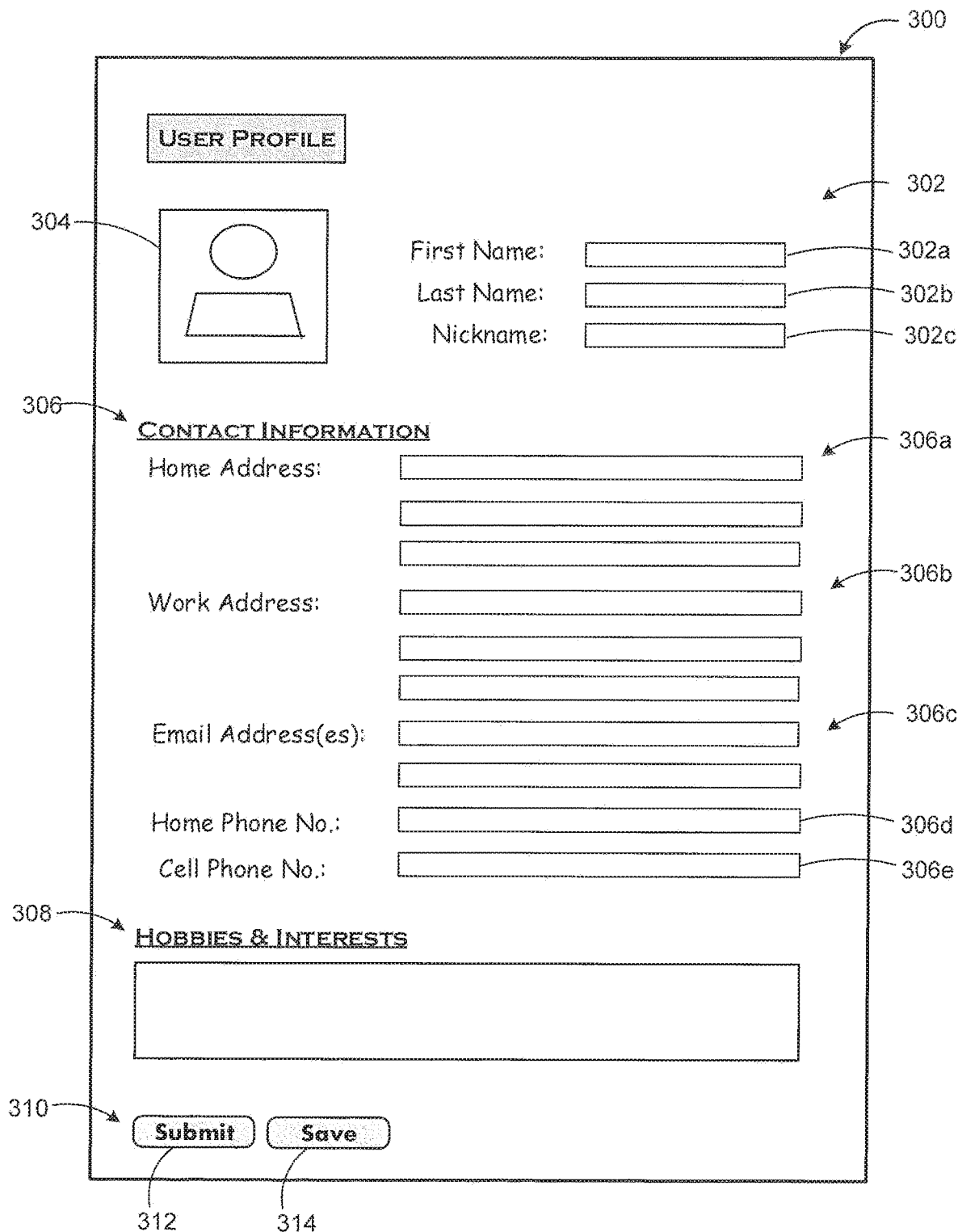
FIG. 3 illustrates an electronic form in accordance with an example embodiment.

FIG. 3 illustrates an example electronic form 300. The electronic form 300 in this example is directed to obtaining personal information from a user of the server system 30B. It will be understood that the illustrated electronic form 300 is merely an example and that other electronic forms may be provided by the server system 30B. Also, it should be understood that the illustrated configuration of the electronic form 300 is for exemplary purposes only and that other configurations and fields may similarly be provided.

The electronic form 300 includes various data fields, such as name fields 302 for receiving data associated with the name of the user, a user image field 304 for receiving a photograph or other image to represent the user, contact information fields 306 for receiving contact data for the user and an interest textbox 308 for receiving data associated with one or more hobbies and interests of the user. The name fields 302 in this example include a first name field 302a, a last name field 302b, and a nickname field 302c. The contact information fields 306 of the electronic form 300 includes a home address field 306a, a work address field 306b, an email address field(s) 306c, a home phone field 306d and a cell phone field 306e.

The server system 30B may not require the user to provide data for all data fields 302 to 308 in FIG. 3 and instead, the server system 30B may only make one or more data fields 302 to 308 mandatory and other fields optional. The data fields 302 to 308 that are mandatory may vary depending on the purpose and implementation of the server system 30B.

The electronic form 300 also includes control components 310, such as control buttons 312 and 314, at a component location. The control components 310 shown in electronic form 300 includes a submission control button 312 for receiving an input from the user directing transmission of the data in the data fields 302 to 308 to the server system 30B and a save control button 314 for receiving an input from the user directing data in the data fields 302 to 308 to be saved at the server system 30B without submitting the data.

Although only the control buttons 312, 314 are illustrated in FIG. 3, it will be understood that other types of control components 310 may similarly be provided in addition or in replacement of the control buttons 312, 314. For example, other example control components 310 can include a cancel control button for receiving an input from the user directing the data in the data fields 302 to 308 to be removed and/or a navigation control button for receiving an input from the user directing the server system 30B to provide another page of the electronic form 300 or to move away from the electronic form 300. A fewer or greater number of control components 310 may also be provided.

Also, as shown in FIG. 3, the component location is at a substantially end portion of the electronic form 300. It will be understood that the control components 310 may similarly be provided at different locations of the electronic form 300.

Figure 2:
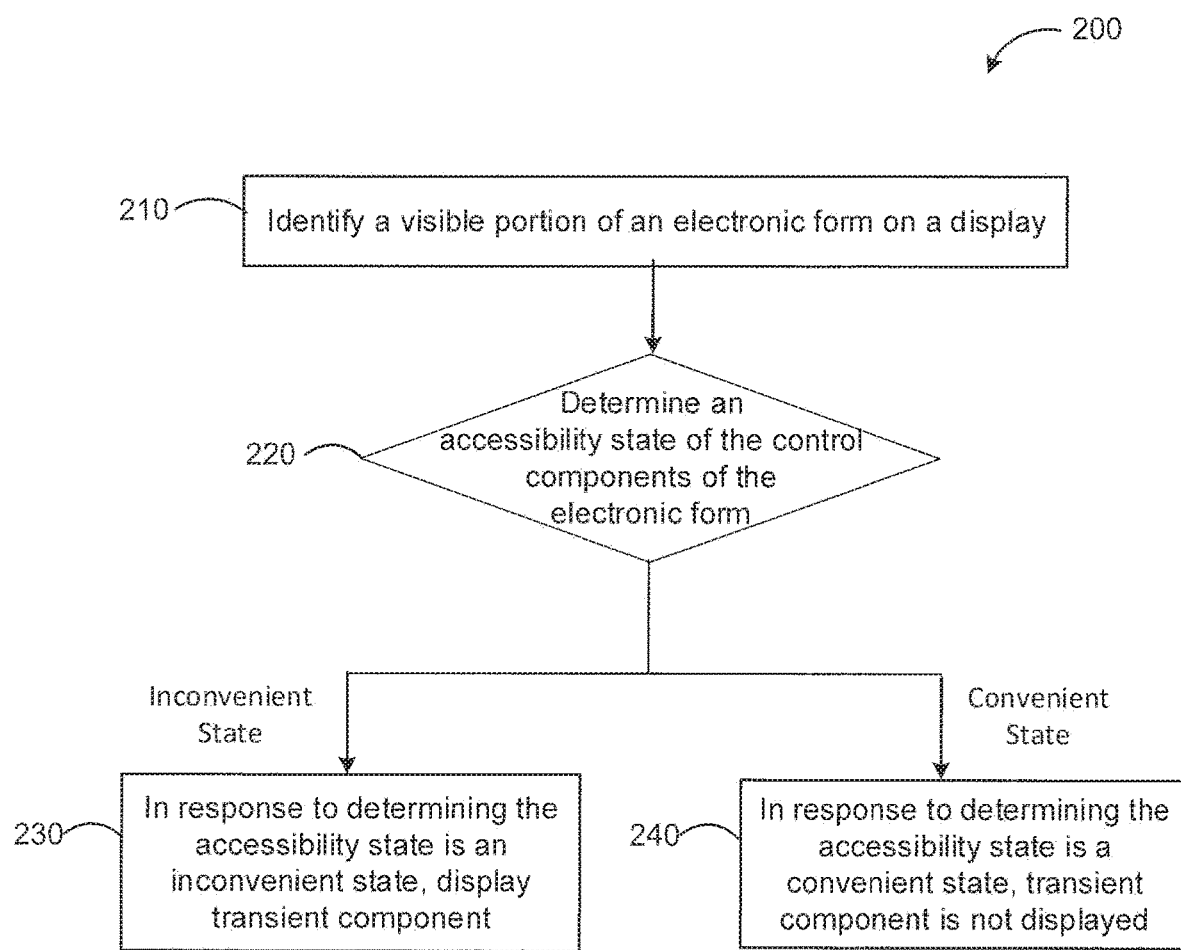
FIG. 2 is a flowchart diagram of an example method for providing an electronic form.

Referring now to FIG. 2, a flowchart diagram illustrating an example method 200 for providing the electronic form 300 is shown. To illustrate the method 200, reference will be made simultaneously to FIGS. 4A to 5B.

At 210, when the electronic form 300 is provided on a display of the computing device 20, the processing module 52 identifies a visible portion of the electronic form 300.

Figure 4A:
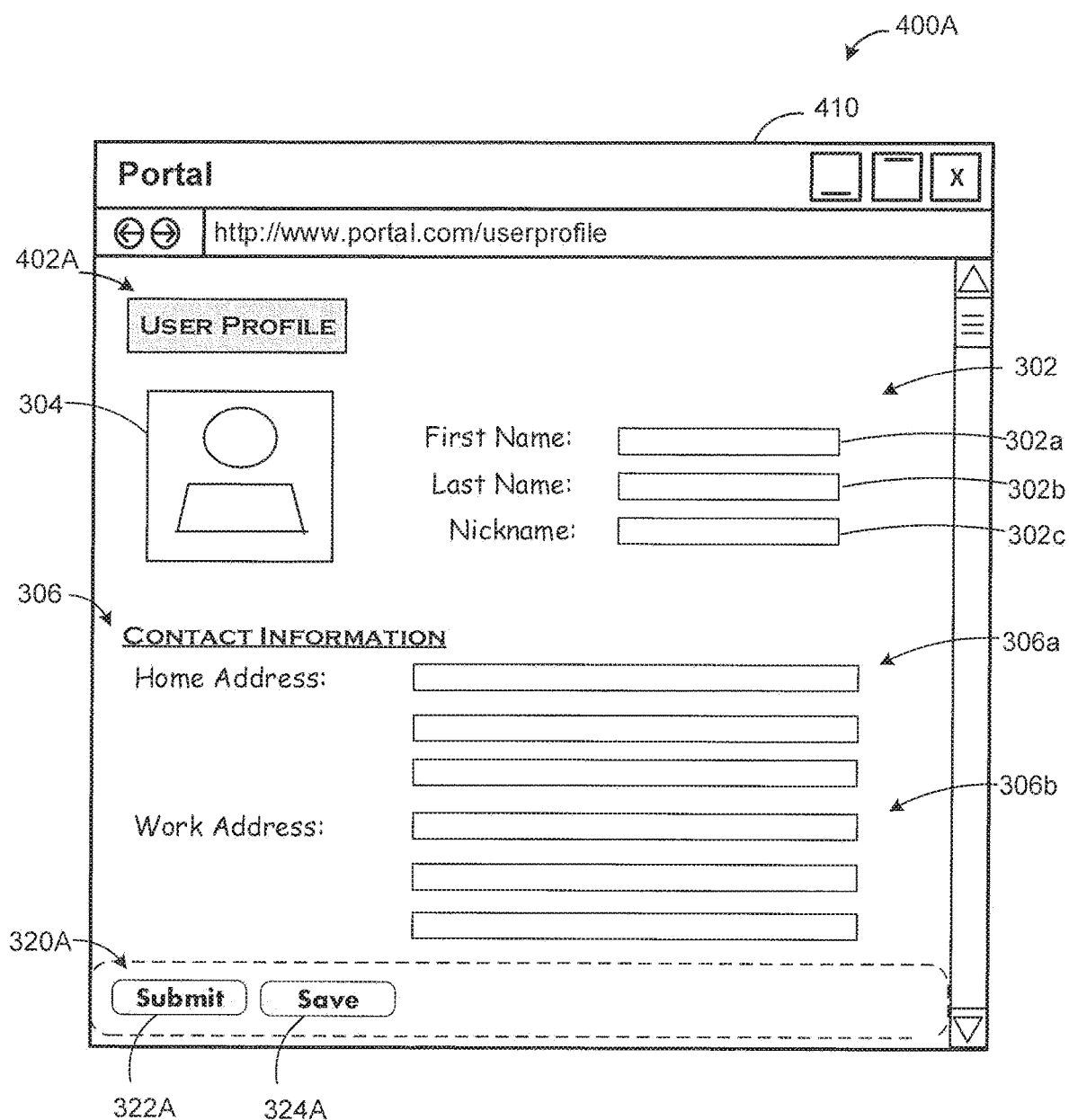
FIGS. 4A to 4C are screenshots of a browser application showing different portions of the electronic form of FIG. 3 in accordance with some example embodiments.
Figure 4B:
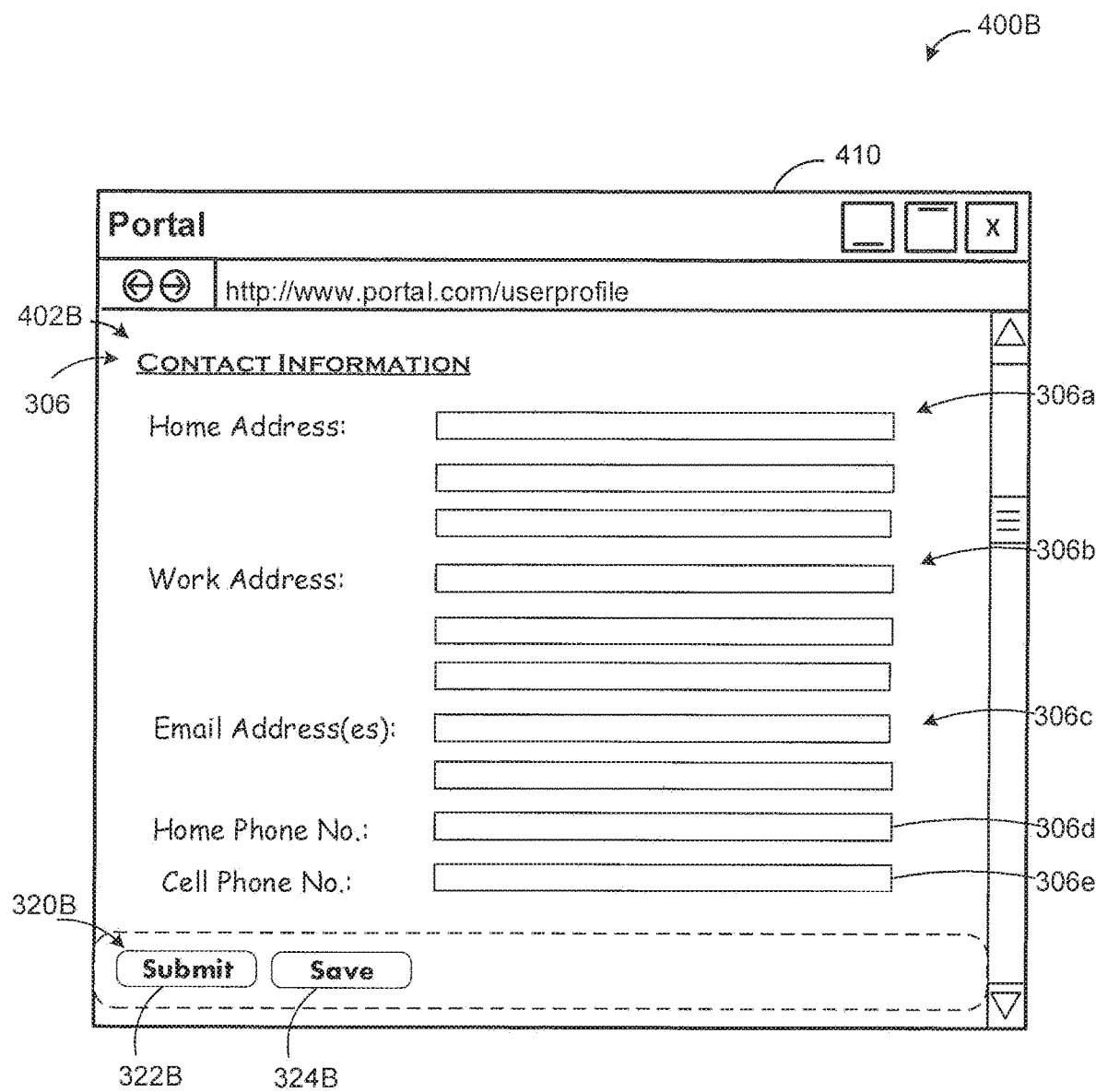
Figure 4C:
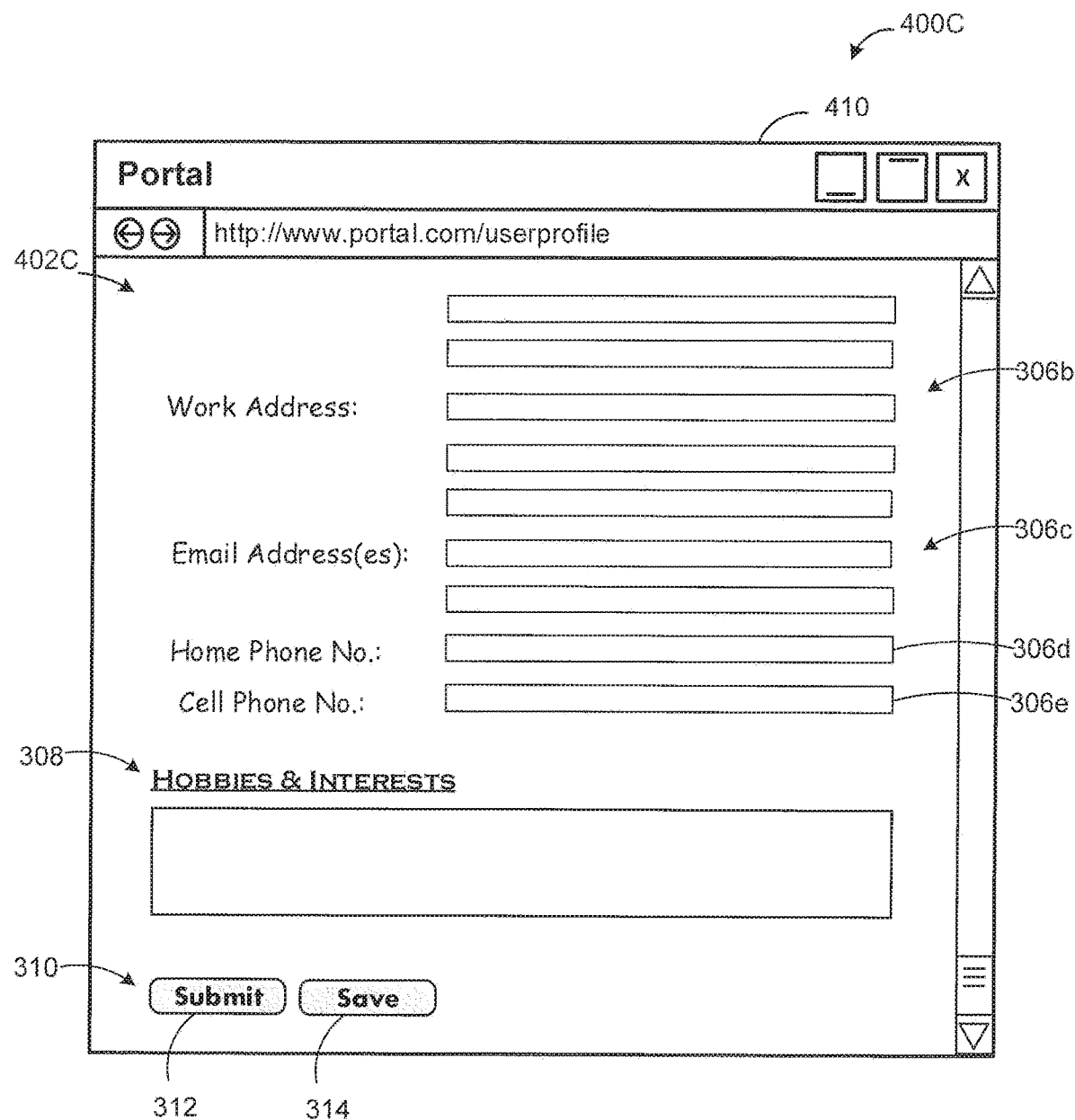

Reference will now be made to FIGS. 4A to 4C, which are screenshots 400A to 400C, respectively, of a browser application 410 showing different portions 402A to 402C, respectively, of the electronic form 300. The browser application 410 is provided at the computing device 20.

As shown in FIG. 4A, when the server system 3B initially provides the electronic form 300 via the browser application 410, the visible portion 402A generally corresponds to a top portion of the electronic form 300. In the example of FIG. 4A, the visible portion 402A includes the name fields 302, the user image field 304, the home address field 306a and the work address field 306b. The control components 310 are not visible within the visible portion 402A since they are located closer to the end of the electronic form 300.

As the user scrolls through the electronic form 300, the other portions of the electronic form 300 become visible. For example, in FIG. 4B, the visible portion 402B includes the contact information fields 306. The control components 310 are still not visible in FIG. 4B. In FIG. 4C, the visible portion 402C includes the work address field 306b, the email address field(s) 306c, the home phone field 306d, the cell phone field 306e, the interest textbox 308 and the control components 310.

To identify the various visible portions 402A to 402C, the processing module 52 can detect, or receive, a top display position of the electronic form 300. The processing module 52 can continuously detect any changes in the visible portions 402 or detect changes at periodic intervals.

The top display position can generally correspond to the location of the electronic form 300 that appears first in a display region of the browser application 410. The processing module 52 can also detect, or receive, a viewing size of the display region of the browser application 410. Based on the top display position and the viewing size, the processing module 52 can generally determine a bottom display position of the electronic form 300. The bottom display position generally corresponds to a location of the electronic form 300 that appears near the end of the display region of the browser application 410.

For embodiments in which the browser application 410 is provided in full screen mode, the top display position and the viewing size may be determined with respect to the dimensions of the display of the computing device 20. For example, the top display position may be determined with respect to a top edge of the display and the viewing size may correspond to a size of the display. The bottom display position will then correspond, generally, to a bottom edge of the display, which is opposite from the top edge of the display.

The processing module 52 can then define the visible portion 402 according to the top display position and the bottom display position.

At 220, the processing module 52 determines an accessibility state of the control components 310.

The accessibility state of the control component 310 can generally indicate a suitability of the component location for the display, or in the example shown in FIGS. 4A to 4C, the display region of the browser application 410. When the processing module 52 determines that the component location is suitable for the display, the processing module 52 can indicate that the accessibility state is a convenient state. The processing module 52 will indicate that the accessibility state is an inconvenient state when the component location is not suitable for the display.

Various methods for determining the accessibility state of the control component 310 will be described. Generally, the processing module 52 can determine the accessibility state based on various data information, such as the component location, a display property of the display and/or properties associated with the visible portion 402.

In some embodiments, the processing module 52 can determine that the accessibility state is the convenient state when the component location is within the visible portion. For example, as shown in FIG. 4C, the control components 310 are provided within the visible portion 402C and therefore, the processing module 52 can set the accessibility state as the convenient state. However, as shown in FIGS. 4A and 4B, the control components 310 are not provided within the respective visible portions 402A and 402B, and therefore, the processing module 52 can set the accessibility state as the inconvenient state.

The processing module 52 may also determine whether the transient control component is usable when determining the accessibility state. The transient control component may not always be usable, or available to be used. For example, certain display sizes may not be appropriate for displaying the transient control component. When the processing module 52 determines that the transient control component is usable, the processing module 52 may indicate that the accessibility state is the convenient state, depending on other relevant factors. However, the processing module 52 will indicate that the accessibility state is the inconvenient state when the transient control component is not usable.

To determine whether the transient control component is usable, the processing module 52 may consider the component location, a display property of the display and/or properties associated with the visible portion 402.

For example, the processing module 52 may indicate the transient control component is usable when the component location is located at least partially beyond the visible portion 402. If any part of the control component 310 is shown within the visible portion 402, the processing module 52 may indicate that the transient control component is not usable. This can prevent simultaneous display of multiple versions of the control components 310, which can be confusing for the user.

In some further embodiments, the processing module 52 may indicate the transient control component is usable when the component location is located outside of the visible portion 402, and a distance between the component location and a nearest edge of the visible portion 402 exceeds a transient threshold. The distance between the component location and the nearest edge of the visible portion 402 can be referred to as a component distance.

The transient threshold generally corresponds to a minimum distance between the visible portion and the component location before the processing module 52 indicates the transient control component is usable. The value of the transient threshold can vary for different applications of the server systems 30B and may also be varied according to different factors, such as user preferences, viewing size, a length of the electronic form 300, and other relevant factors.

In some embodiments, the processing module 52 may determine whether the transient control component is usable based on the display property, such as a device type and/or a viewing size of the display.

For example, in response to detecting or determining that the device type of the computing device 20 is a mobile device, the processing module 52 may indicate that the device type is a mobile display type and therefore, the transient control component is not usable. The displays of most mobile devices are generally small and therefore, may not be appropriate to display the transient control component.

In another example, the processing module 52 may detect the viewing size of the display for determining whether the transient control component is usable or not. The viewing size is an area that is available for displaying the electronic form 300. The viewing size may be determined in respect of the display of the computing device 20 or a display region of the application displaying the electronic form 300 (e.g., the browser application 410). Instead of only considering the device type, the processing module 52 may determine whether the viewing size of the display can accommodate the transient control component.

In response to determining the viewing size, the processing module 52 can determine whether the determined viewing size exceeds a size threshold and indicate the transient control component is usable when the viewing size exceeds the size threshold. The size threshold generally indicates a minimum view area in order for the processing module 52 to indicate the transient control component is usable. Similar to the value of the transient threshold, the value of the size threshold can vary for different applications of the server systems 30B and may also be varied according to different factors, such as user preferences, a length of the electronic form 300, and other relevant factors.

The described methods for determining the accessibility state can be applied individually, or in combination. For example, in some embodiments, the processing module 52 can determine the accessibility state based on only whether the component distance exceeds the transient threshold. In some other embodiments, the processing module 52 can determine the accessibility state based on both the transient threshold and the size threshold. That is, only when the component distance exceeds the transient threshold and the viewing size exceeds the size threshold can the processing module 52 indicate the accessibility state is the inconvenient state. Other combinations may similarly be applied.

At 230, in response to determining that the accessibility state is the inconvenient state, the processing module 52 displays a transient control component.

Based on the determination at 220, the processing module 52 can operate to display the transient control component when the accessibility state is the inconvenient state. For example, as shown in FIGS. 4A and 4B, the respective transient control components 320A and 320B are shown. The transient control components 320 are generally a version of the control component 310 and can operate as the control components 310. The difference between transient control components 320 and the control component 310 is that the transient control components 320 can be provided at different portions of the electronic form 300, as shown in FIGS. 4A and 4B.

By enabling, when applicable, the transient control components 320 to "float" within the electronic form 300 or the display, users can access the control component 310 without repeatedly scrolling through the electronic form 300. The display of the transient control components 320 can also immediately indicate to the user which control components 310 are provided on the electronic form 300 so that user will understand how the electronic form 300 is generally structured from the beginning.

Figure 5A:
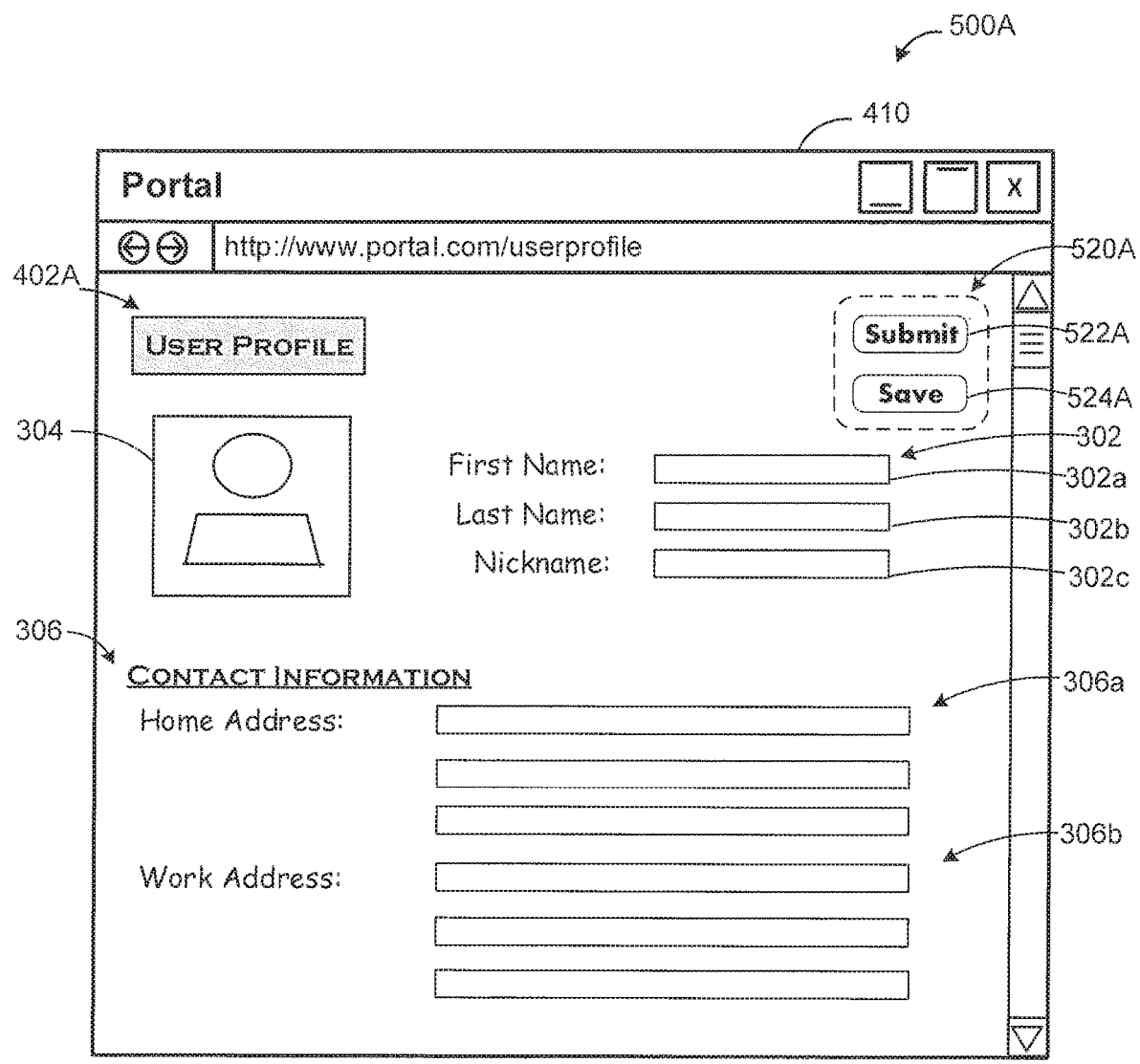
FIGS. 5A and 5B illustrate different embodiments of the screenshot of FIG. 4A.
Figure 5B:
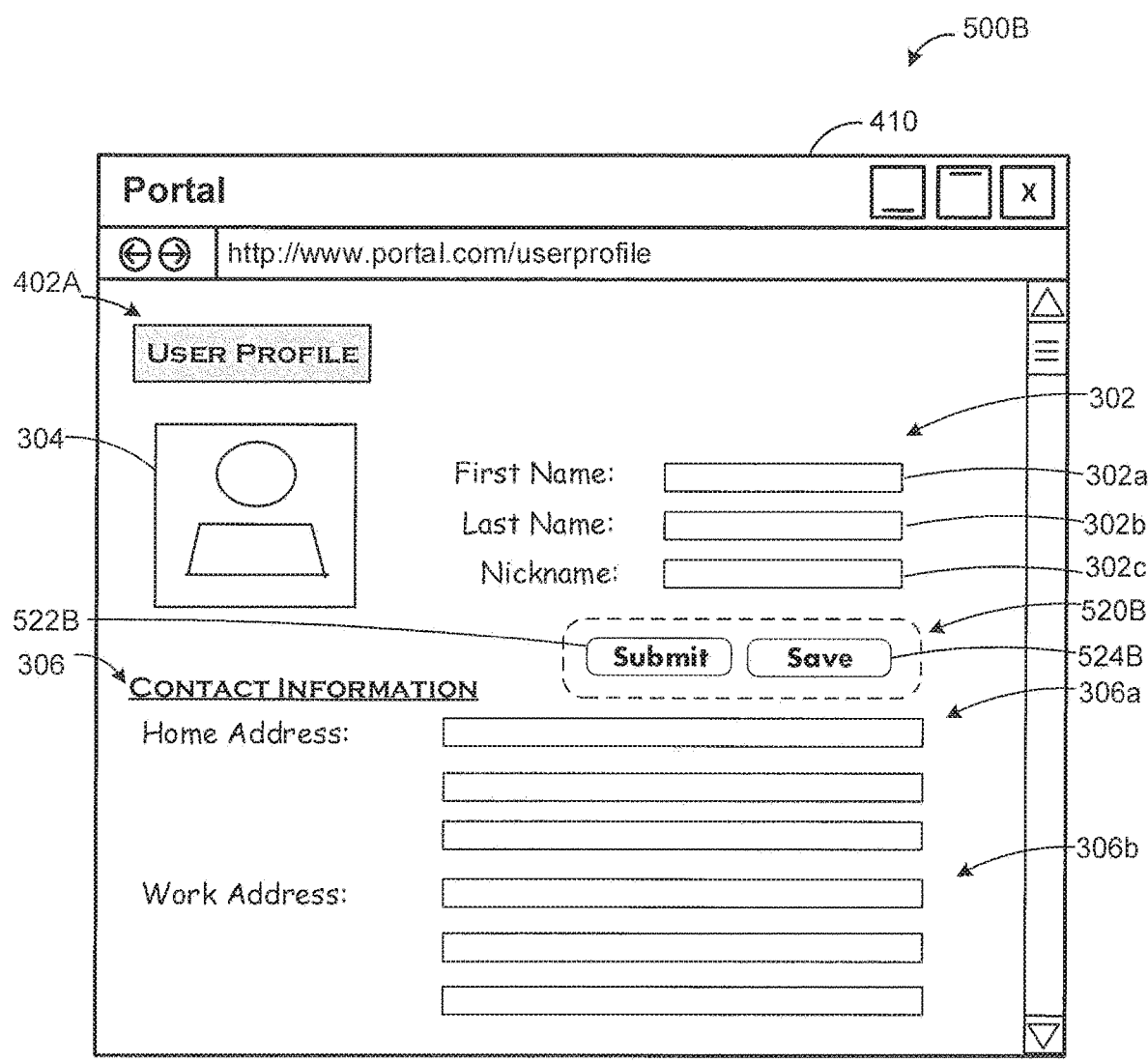

FIGS. 5A and 5B illustrate, generally at 500A and 500B, respectively, different embodiments of the screenshot of FIG. 4A. Each of FIGS. 5A and 5B generally correspond to FIG. 4A. The configuration and position of the transient control components 520A and 520B in the respective FIGS. 5A and 5B vary from the transient control component 320A of FIG. 4A. As shown in FIG. 5A, the transient control component 520A can be provided in a configuration that differs from the control component 310 and at a location that differs from the transient control component 320A. FIG. 5B provides the transient control component 520B at yet another location. Other variations of the configurations and position of the transient control components 320 may similarly be provided.

In some embodiments, the transient control component 320 can be provided so that at least one visual property of the transient control component 320 is different from the corresponding visual property of the control component 310. The visual property can include any one or more of a colour, pattern, size, configuration, and orientation, for example. As shown in FIGS. 4A and 4B, the transient control component 320 is surrounded by a box with a stippled border and the control component 310 is not. Also, the control buttons 322A and 324A of the transient control component 320A are shaded in a different manner as the control buttons 312 and 314 of the control component 310.

By visually presenting the transient control component 320 in a different manner from the control component 310, the user can clearly identify when the transient control component 320 is being provided. In embodiments when the control component 310 is located substantially near the electronic form 300, the user will also easily know that the end of the electronic form 300 has been reached when the control component 310 is shown instead of the transient control component 320.

In some embodiments, the processing module 52 can further visually emphasize the transition between the transient control component 320 to the control component 310, and vice versa. For example, when the transition is to provide the control component 310, the processing module 52 may cause the control component 310 to initially expand or flash. Similar effects may be applied to the transient control component 320 when the transaction is to provide the transient control component 320. It will be understood that different visual effects may similarly be applied.

At 240, in response to determining that the accessibility state is the convenient state, the processing module 52 does not display the transient control component 320.

The embodiments herein been described here by way of example only. Various modification and variations may be made to these example embodiments. Also, in the various user interfaces illustrated in the figures, it will be understood that the illustrated user interface text and controls are provided as examples only and are not meant to be limiting. Other suitable user interface elements may be possible.

We claim:

1. A method of providing an electronic form for a display, the method comprising:
   identifying a visible portion of the electronic form, the electronic form including a control component at a component location of the electronic form and the control component being operable to receive an input from a user;
   determining whether to provide a transient control component within the visible portion, the transient control component being a version of the control component and the determining whether to provide the transient control component including:
      identifying whether the component location is within the visible portion;
      assessing whether the transient control component is usable based on at least one of a display property of the display and the component location; and
      indicating the transient control component is to be provided within the visible portion when the component location is at least partially beyond the visible portion and the transient control component is usable, such that only one of the control component and the transient control component is selectively displayable within the visible portion of the electronic form as the visible portion changes; and
   displaying the transient control component within the visible portion when the transient control component determined to be provided.

2. The method of claim 1, wherein assessing whether the transient control component is usable based on at least one of the display property of the display and the component location comprises:
   determining a component distance between the component location and an edge of the visible portion;
   determining if the component distance is less than a transient threshold, the transient threshold being a minimum distance between the visible portion and the component location before the transient control component is usable; and
   indicating the transient control component is usable when the component distance is greater than the transient threshold.

3. The method of claim 1, wherein:
   the display property comprises a device type of the display; and
   the method comprises:
      determining the device type is a mobile display type, the mobile display type indicating the display is provided on a mobile device; and
      indicating the transient control component is unusable when the device type is the mobile display type.

4. The method of claim 1, wherein:
   the display property comprises a viewing size of the display; and
   the method comprises:
      determining if the viewing size is less than a size threshold, the size threshold being a minimum view area required for the transient control component to be usable; and
      indicating the transient control component is usable when the viewing size corresponds to at least the size threshold.

5. A system for providing an electronic form for a display, the system comprising a processor configured to:

identify a visible portion of the electronic form, the
electronic form including a control component at a
component location of the electronic form and the
control component being operable to receive an input
from a user;
determine whether to provide a transient control component within the visible portion, the transient control
component being a version of the control component
and the determining whether to provide the transient
control component including:
identifying whether the component location is within the
visible portion;
assessing whether the transient control component is
usable based on at least one of a display property of the
display and the component location; and
indicating the transient control component is to be provided within the visible portion when the component
location is at least partially beyond the visible portion
and the transient control component is usable, such that
only one of the control component and the transient
control component is selectively displayable within the
visible portion of the electronic form as the visible
portion changes; and
display the transient control component within the
visible portion when the transient control component
determined to be provided.

6. The system of claim 5, wherein the processor is
configured to:
determine a component distance between the component
location and an edge of the visible portion;
determine if the component distance is less than a
transient threshold, the transient threshold being a
minimum distance between the visible portion and
the component location before the transient control
component is usable; and
indicate the transient control component is usable when
the component distance is greater than the transient
threshold.

7. The system of claim 5, wherein:
the display property comprises a device type of the
display; and
the processor is configured to:
determine the device type is a mobile display type, the
mobile display type indicating the display is provided on a mobile device; and
indicate the transient control component is unusable
when the device type is the mobile display type.

8. The system of claim 5, wherein:
the display property comprises a viewing size of the
display; and
the processor is configured to:
determine if the viewing size is less than a size threshold, the size threshold being a minimum view area
required for the transient control component to be
usable; and
indicate the transient control component is usable when
the viewing size corresponds to at least the size
threshold.

9. A method of providing an electronic form for a display,
the method comprising:
identifying a visible portion of the electronic form, the
electronic form including a control component at a
component location of the electronic form and the
control component being operable to receive an input
from a user;
determining an accessibility state of the control component based on the component location and at least one
of a display property of the display and the visible
portion, the accessibility state being a convenient state
when the component location is suitable for the display
and the accessibility state being an inconvenient state
when the component location is not suitable for the
display, such that only one of the control component
and the transient control component is selectively displayable within the visible portion of the electronic
form as the visible portion changes; and
in response to determining that the accessibility state is
the inconvenient state, displaying a transient control
component on the display, the transient control component being a version of the control component.

10. The method of claim 9, wherein:
the display property comprises a viewing size of the
display, the viewing size indicating an area available
for displaying the electronic form; and
identifying the visible portion of the electronic form
comprises:
receiving a top display position of the electronic form,
the top display position being a first location of the
electronic form and the first location corresponding
to a top edge of the display;
determining, based on the top display position and the
viewing size, a bottom display position of the electronic form, the bottom display position being a
second location of the electronic form, the second
location correspond to a bottom edge of the display
and the bottom edge being opposite from the top
edge; and
defining the visible portion according to the top display
position and the bottom display position.

11. The method of claim 9, wherein determining the
accessibility state of the control component comprises:
determining if the component location is within the visible portion; and
in response to determining the component location is
within the visible portion, setting the accessibility state
as the convenient state and otherwise, setting the accessibility state as the inconvenient state.

12. The method of claim 9, wherein determining the
accessibility state of the control component comprises:
determining whether the transient control component is
usable based on at least one of the component location,
the display property and the visible portion; and
setting the accessibility state as the convenient state when
the transient control component is unusable.

13. The method of claim 12, further comprises:
determining if the component location is within the visible portion;
in response to determining the component location is
outside the visible portion, determining a component
distance between the component location and an edge
of the visible portion;
determining if the component distance is less than a
transient threshold, the transient threshold being a
minimum distance between the visible portion and the
component location before the transient control component is usable; and
indicating the transient control component is usable when
the component distance is greater than the transient
threshold.

14. The method of claim 12, wherein:
the display property comprises a device type of the
display; and the method further comprises:
  determining the device type is a mobile display type, the mobile display type indicating the display is provided on a mobile device; and
  indicating the transient control component is unusable when the device type is the mobile display type.

15. The method of claim 12, wherein:
the display property comprises a viewing size of the display; and
the method further comprises:
  determining if the viewing size is less than a size threshold, the size threshold being a minimum view area required for the transient control to be usable; and
  indicating the transient control component is usable when the viewing size corresponds to at least the size threshold.

16. The method of claim 9, wherein displaying the transient control component on the display comprises:
  displaying the transient control component in at least one of a colour, pattern and size different from the respective colour, pattern and size of the control component.

17. The method of claim 9, wherein the control component comprises:
  at least one push button control configured for receiving the input for submitting any one of a request to save data provided on the electronic form, a request to remove any data provided on the electronic form, and a request to proceed to a subsequent page of the electronic form.

18. The method of claim 9, wherein the component location is at a substantially end portion of the electronic form.

19. A system for providing an electronic form for a display, the system comprising a processor configured to:
  identify a visible portion of the electronic form, the electronic form including a control component at a component location of the electronic form and the control component being operable to receive an input from a user;
  determine an accessibility state of the control component based on the component location and at least one of a display property of the display and the visible portion, the accessibility state being a convenient state when the component location is suitable for the display and the accessibility state being an inconvenient state when the component location is not suitable for the display, such that only one of the control component and the transient control component is selectively displayable within the visible portion of the electronic form as the visible portion changes; and
  in response to determining that the accessibility state is the inconvenient state, display a transient control component on the display, the transient control component being a version of the control component.

20. The system of claim 19, wherein:
the display property comprises a viewing size of the display, the viewing size indicating an area available for displaying the electronic form; and
the processor is configured to:
  receive a top display position of the electronic form, the top display position being a first location of the electronic form and the first location corresponding to a top edge of the display;
  determine, based on the top display position and the viewing size, a bottom display position of the electronic form, the bottom display position being a second location of the electronic form, the second location correspond to a bottom edge of the display and the bottom edge being opposite from the top edge; and
  define the visible portion according to the top display position and the bottom display position.

* * * * *